United States Patent [19]

Triplett et al.

[11] 3,772,573

[45] Nov. 13, 1973

[54] MOLDED PALLET

[75] Inventors: Gerald H. Triplett; Thomas A. Dowds, both of Plymouth, Mich.

[73] Assignee: Burroughs Corporation, Detroit, Mich.

[22] Filed: July 5, 1972

[21] Appl. No.: 269,020

[52] U.S. Cl. ....... 317/101 R, 206/46 FC, 206/65 F, 317/101 DH

[51] Int. Cl. ....... H02b 1/04

[58] Field of Search ....... 206/46 FC, 65 F; 317/101 CM, 101 DH; 174/68.5

[56] References Cited

UNITED STATES PATENTS

| | | | |
|---|---|---|---|
| 3,631,297 | 12/1971 | Conner | 317/101 CM |
| 3,375,576 | 4/1968 | Klein et al. | 174/68.5 |
| 3,124,248 | 3/1964 | Geoffrion et al. | 206/65 F |

FOREIGN PATENTS OR APPLICATIONS

| | | | |
|---|---|---|---|
| 1,462,407 | 11/1966 | France | 206/46 FC |

*Primary Examiner*—David Smith, Jr.
*Attorney*—Paul W. Fish et al.

[57] ABSTRACT

A one-piece pallet to be used with a terminal and wire side of a backplane assembly which will prevent accidental damage to the assembly during shipping and installing. The pallet is rectangularly shaped having a plurality of parallel ribs which extend across one side serving as restraining means. During shipping or installing, a certain number of terminals will penetrate the polystyrene ribs insuring retention of the backplane assembly to the pallet. Access apertures are provided on the pallet for facilitating the mounting of the backplane assembly to a backplane support frame. In addition, the disclosure includes a method of mounting a backplane assembly onto a pallet and the removal of the pallet from the backplane assembly after its installation.

7 Claims, 8 Drawing Figures

MOLDED PALLET

BACKGROUND OF THE INVENTION

1. Field of the Invention

This invention relates generally to protective packaging and more particularly to a structure for and a method of effectively preventing accidental damage to the terminal and wire side of a backplane assembly in a computer system during shipping and installation.

A computer system is generally composed of a central processing unit and a plurality of peripheral equipment such as printers, card readers, console inquiry stations, magnetic tape recorders and readers.

As the need for increased processing power is developed, in any one particular computer installation, the solution quite frequently is to add additional memory and peripherals to that computer system. This may require the use of backplane assemblies installed on the frame of the existing computer to provide appropriate interconnections between the existing computer elements and the memory or peripherals that are being added.

Therefore, as more and increasingly complex information is sought by the computer user, additional memory and peripheral devices and hence backplane assemblies will be required to provide faster and more efficient means for processing data.

2. Description of the Prior Art

When backplane frames and backplane assemblies are assembled prior to shipping, damage in transit is not uncommon. Furthermore, it has become more convenient to ship these parts separately since they are frequently manufactured at different locations.

The performance of the computer hardware may be verified with test equipment if the backframe is sent to the customer while the backplane assembly is still being wired by the manufacturer because, as is well known, most computer systems are custom made for the particular needs of a computer user. However, one of the problems encountered during shipping and handling is that the terminal and wire side of the backplane assembly would be accidentally damaged. This damage is usually in the form of broken terminals and wires or that the wires are pulled from their respective terminals. To try and solve the problem, different packaging arrangements have been tried and found to be either too expensive or ineffective.

Another problem that frequently occurs is when additional equipment is needed for increasing the input/output capacity of a computer system. The customer usually does not want to return his main frame to the computer manufacturer and then have a new one installed in its place. This would be too costly. Therefore, to increase a computer system, additional backplane assemblies are usually added. The assemblies are built and tested at the home plant of the computer manufacturer before shipping to the customer. However, during shipping and installing of the additional assemblies, accidental damage may occur which generally requires re-ordering a new backplane assembly to replace the damaged one. This proves to be very costly in time and material to both the manufacturer and the customer. Again different methods of packaging have been tried to overcome the problems of accidental damage to the terminal and wire side of the backplane assembly.

Prior solutions, such as packing the backplane so that the delicate terminals are not readily subject to damage is both time consuming and expensive. Inadequate packing, as it has been found in practice, quite frequently results in accidental damage to the terminals, bent and broken wires and the wires becoming disconnected from their associated connector blocks.

Another problem frequently encountered during installation arises when the installer accidentally damages the backplane assembly because there are no means for handling the backplane assembly thus making it difficult to manipulate when mounting the assembly to the frame. For example, a slip of the installer's hand could cause a terminal to bend or a wire to break or pull away from its associated terminal. Thus, additional installation time would be required which would be, needless to say, irritating to both the customer and installer in addition in adding to the general expense of the operation.

To correct these problems, a one-piece pallet has been invented to overcome the above stated difficulties; the pallet provides means for protecting the terminal and wire side of the backplane assembly during shipping without the need of special packing procedures during installation.

SUMMARY OF THE INVENTION

The present invention is directed to a packaging and installing arrangement for a backplane assembly. The assembly includes connector blocks having exposed projections or terminals parallel to one another providing securing means for a plurality of jumper wires. A one-piece pallet, serving as a shield, is provided to protect the terminals and the wires of the backplane assembly after packaging and during installation. The pallet has raised portions or ribs which the terminals of the backplane assembly may penetrate. This permits the terminals to be frictionally retained by the pallet. The pallet also serves to facilitate the initial installation process, that is, the mounting of said assembly to a backplane frame.

It is accordingly an object of the invention to provide a method for mounting a one-piece pallet to a backplane assembly while providing maximum protection for the depending parts of a manufactured article.

It is another object of the invention to provide an accurate, reliable and durable method for mounting a one-piece molded pallet of polystyrene foam to a backplane assembly without the need for any additional fasteners.

Another object of the invention is to provide a one-piece pallet for protecting depending parts of a backplane assembly, such as a plurality of exposed terminals and jumper wires, from damage during packaging, shipping and installing.

It is further an object of the invention to provide a means for facilitating mounting of the backplane assembly to a backplane frame.

It is still another object of the invention to provide a means for protecting the jumper wires against damage by a screw driver when inserted into the access apertures on the one-piece pallet for threading the mounting screws of the backplane assembly into the backplane frame, hence securing the assembly thereto.

It is still another object of the invention to improve the performance and reliability of the backplane assembly through an improved packaging arrangement.

BRIEF DESCRIPTION OF THE DRAWINGS:

These and other objects, advantages and aspects of the invention will be more clearly understood from the following description when read in conjunction with the accompanying drawings, in which.

DETAILED DESCRIPTION OF THE INVENTION

The one-piece pallet or panel disclosed and claimed herein is particularly suited for a backplane assembly having a plurality of exposed terminals extending from electrical connector blocks or the like, and including a plurality of jumper or connector wires. The size and shape of the pallet are, of course, determined by the size and shape of the backplane assembly and the size and shape of the shipping container. For the purpose of explaining the preferred embodiment of the pallet it is illustrated as being rectangular. The pallet serves as a protective shield for the assembly and is adopted to facilitate in its installation. The pallet is retained to its associated product without the use of any internal or external fastening means. It will be further noted that while a backplane assembly is being used for illustrative purposes, other types of electronic equipment or subassemblies may be used with the pallet of the present invention.

Figure 1:
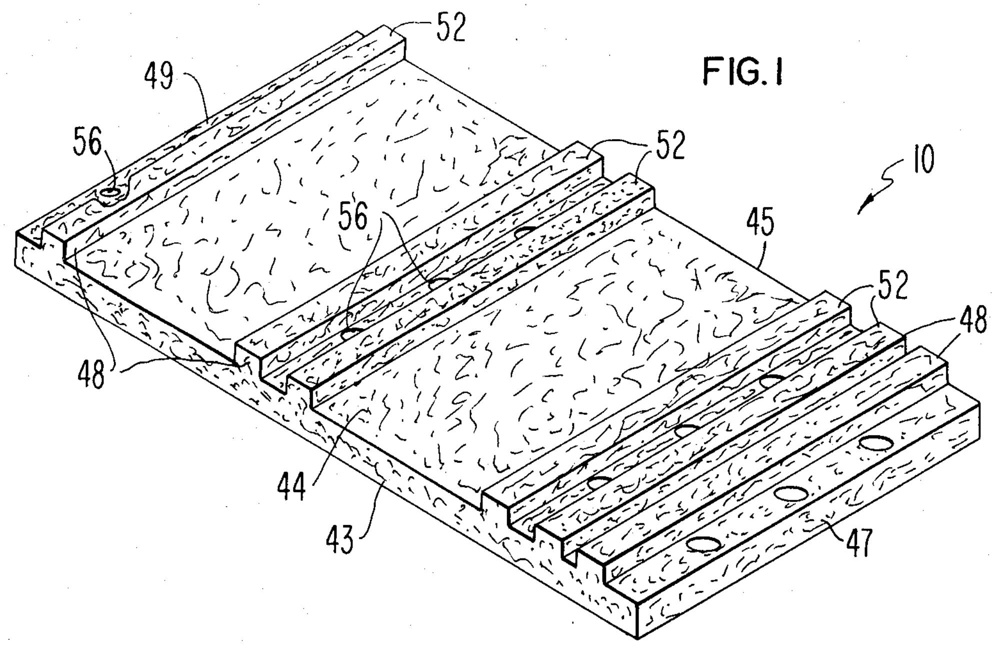
FIG. 1 is a perspective view of a one-piece pallet showing a plurality of raised portions which extend across one surface of the pallet and further showing a plurality of access apertures therein.
Figure 2:
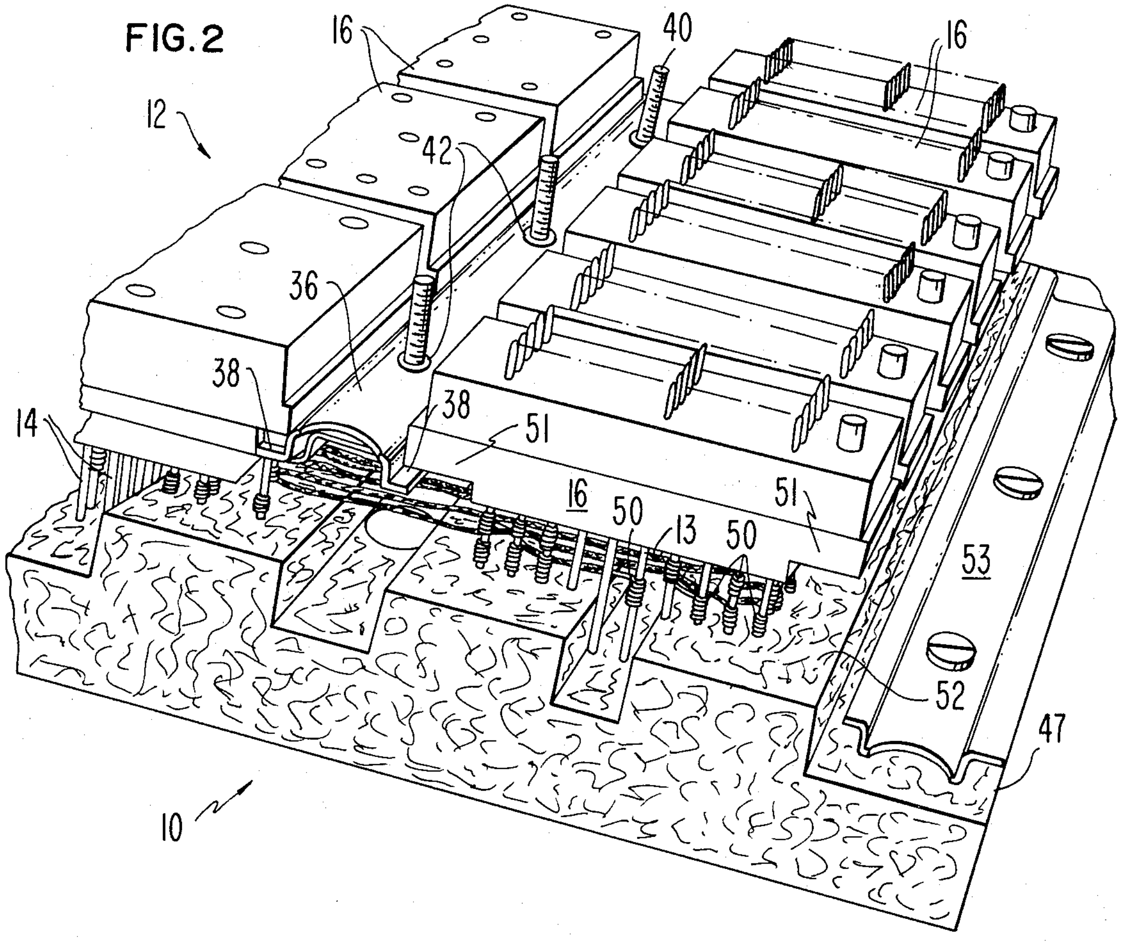
FIG. 2 is an enlarged fragmentary perspective view of a backplane assembly with its terminals penetrating the raised portions of the one-piece pallet.
Figure 3:
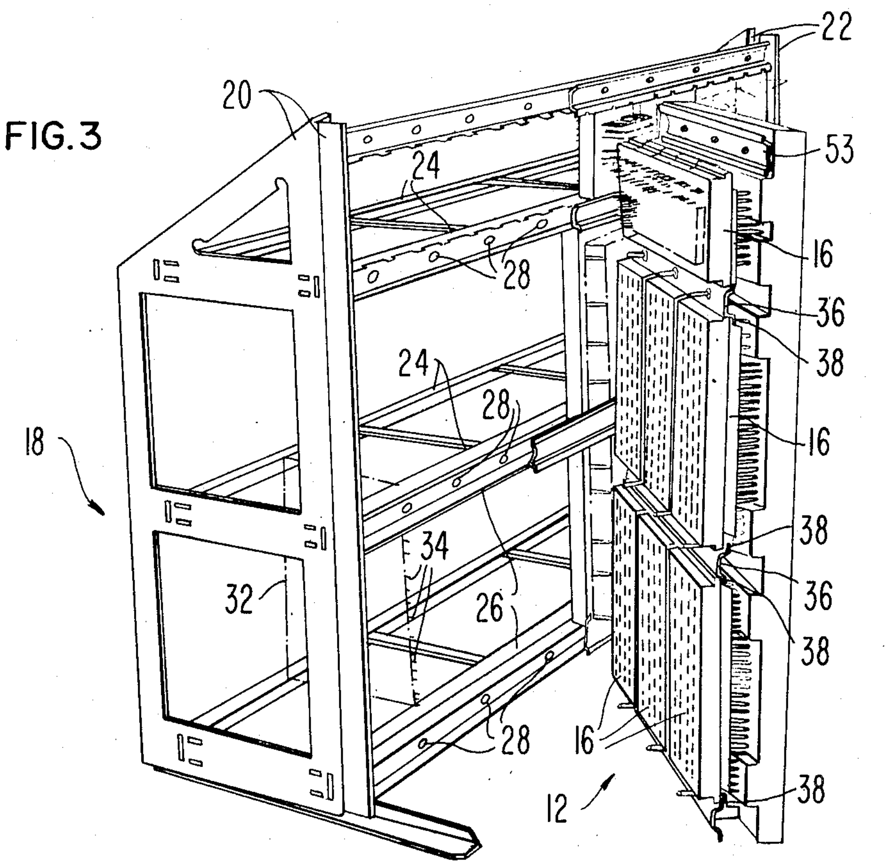
FIG. 3 is a perspective view showing a backplane assembly with its associated one-piece pallet in a position for facilitating the mounting of the backplane assembly to the backplane support frame.

Turning now to the drawings and particularly to FIGS. 1, 2 and 3, there is illustrated a preferred embodiment of a one-piece pallet 10. In FIG. 2, a backplane assembly 12 has a terminal and wire side 13, wherein the pallet 10 is joined thereto by the penetration of a plurality of projections or terminals 14 extending from electrical connector blocks 16. Upon inspection of FIG. 3 it will be seen that the backplane assembly 12 is illustrated in a pre-mounting position rearwardly of a backplane support frame as generally indicated at 18.

The structure of the backplane support frame 18 includes a pair of upright supports 20 and 22, U-shaped cross braces 24 and support members 26 extending parallel to each other between the upright supports 20 and 22 respectively. The ends of the cross braces 24 and support members 26 are secured to the inside surfaces of the upright supports 20 and 22 by any suitable means. As illustrated best in FIGS. 3 and 7, the U-shaped braces 24 and support members 26 are disposed in the same horizontal plane wherein the braces 24 included a plurality of laterally spaced holes 27 along its length thereof. The brackets 26 are adjacent to the braces 24 and include coaxially tapped holes 28 along the support members 26. The braces 24 are slotted for receiving and supporting printed circuit cards 32, which are shown (in phantom lines) in FIGS. 3, 7 and 8. These circuit cards 32 serve to couple additional features from peripheral units to a central processing unit of a computer system when the contact members 34 of the circuit cards 32 are insertably mated with their associated connector blocks 16.

Figure 7:
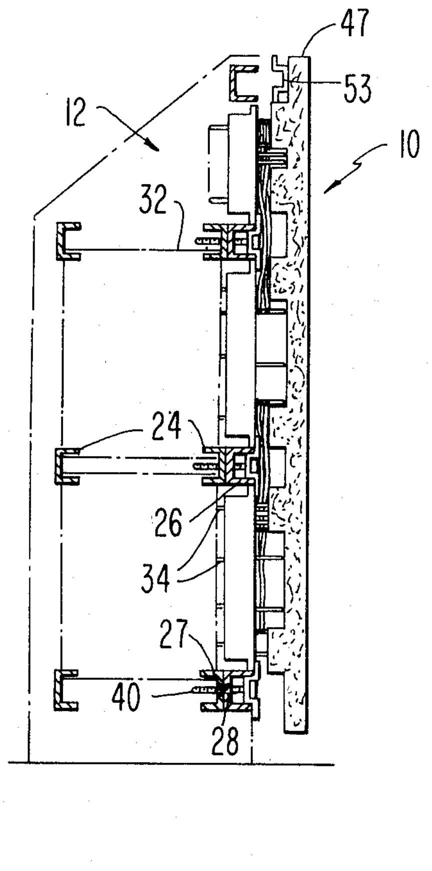
FIG. 7 is a diagrammatic view illustrating the backplane assembly mounted to the backplane support frame still having its associated pallet attached thereto.

As best shown in FIG. 3, the backplane assembly 12 is positioned rearwardly of the backplane support frame 18 and is herein illustrated as comprising a plurality of connector blocks 16 and their mounting brackets 36. The mounting brackets 36 are channel shaped and as shown are in parallel relationship to one another. Each pair of mounting brackets is bridged by one or more connector blocks 16. A plurality of mounting screws 40 are laterally spaced along the back of the mounting brackets 36 and are retained in place by paper washers 42. The mounting brackets 36 have right-angle outwardly-extending flanges 38 to which the ends of the blocks 16 are secured by any suitable means (not shown). It is the mounting arrangement of these connector blocks 16 to the edges of the mounting brackets 36 which provide the rectangular form of the backplane assembly. The connector blocks 16, in generaly, may be of a conventional and well-known type. Therefore, when the backplane assembly 12 is installed as shown in FIGS. 4 and 7, the mounting screws 40 will be aligned with their respective tapped holes 28 in the support members 26 of the backplane frame 18 and will be secured therein for mounting the backplane assembly thereon.

Figure 4:
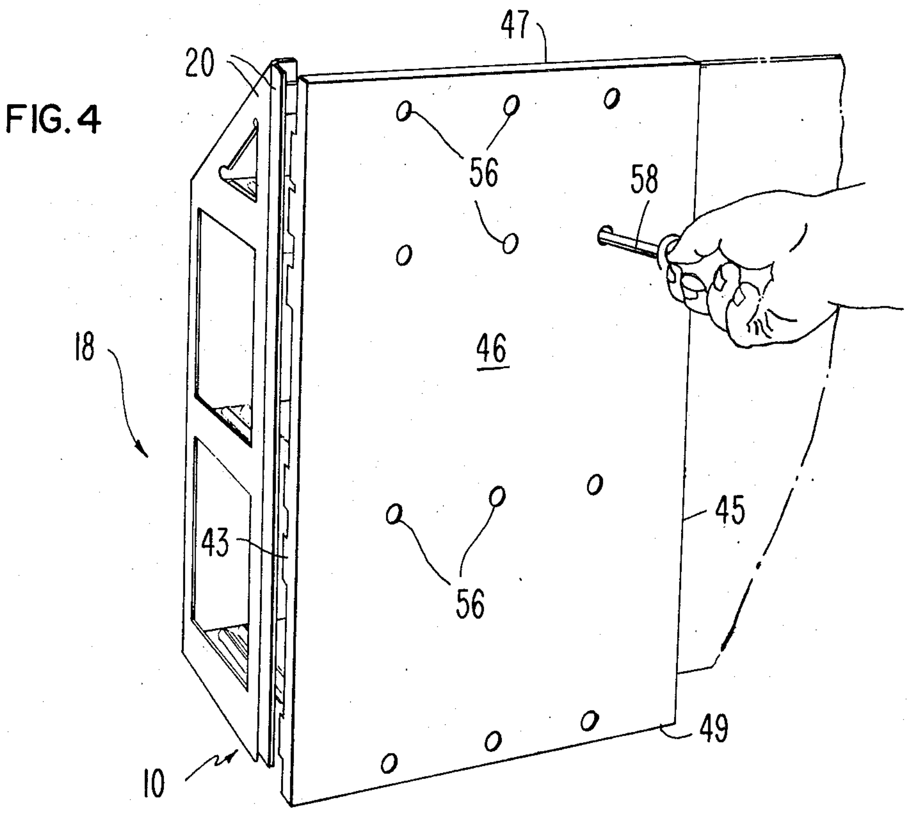
FIG. 4 is a perspective view showing the stem of a screw driver inserted into one of the access apertures for securing the backplane assembly to the support frame.

Referring now to FIGS. 1 and 4, the configuration of the one-piece pallet 10 will be described in detail. The pallet, in the preferred embodiment, is composed of plastic material 54, preferably polystyrene or polyurethane foam because of its light weight and porous characteristics. In addition, the pallet 10 is formed in a single molding process and is properly dimensioned and designed for providing maximum protection for the depending parts as described above. The pallet 10 is illustrated as generally rectangular wherein its overall size slightly exceeds the corresponding backplane assembly 12. The pallet 10 is generally flat having an inner and outer side or surface 44 and 46, respectively. Furthermore, the pallet 10 has edge portions 43, 45 and end portions 47, 49. The top end portion 47 carries cable mounting bracket 53 for securing cable connectors (not shown) to the backplane frame 18.

Figure 6:
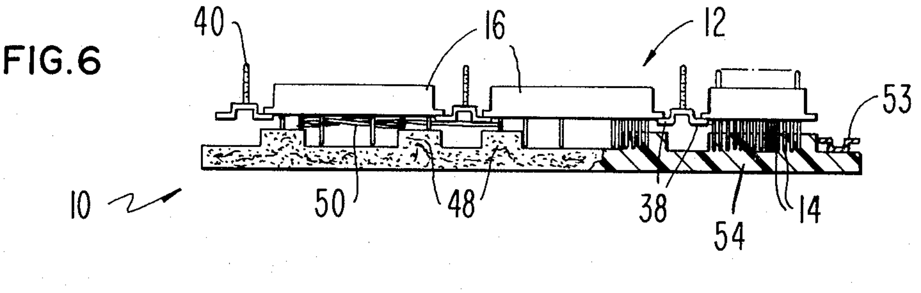
FIG. 6 is a diagrammatic view illustrating the backplane assembly attached to the one-piece pallet showing the penetration of the terminals into the pallet.
Figure 8:
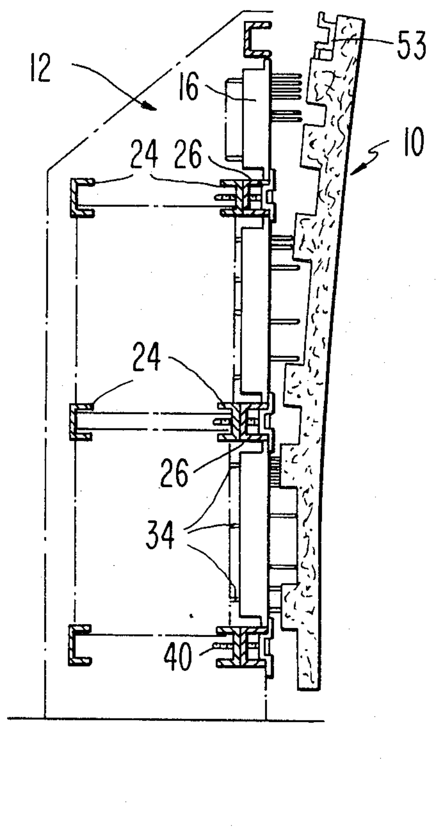
FIG. 8 is a diagrammatic view similar to FIG. 7 but with the pallet being partially removed from the terminals of the backplane assembly.

For the preferred embodiment of the invention, the inner side 44 has a plurality of ribs or raised portions 48 which extend across the inner side 44 from one side edge portion 43 to the other edge portion 45 transversely to the longitudinal axis of the pallet 10. Upon inspection of FIGS. 2, 6 and 7 it will be seen that the raised portions 48 are spaced to support opposite ends 51 of the connector blocks 16 to provide a more rigid backing for the backplane assembly 12. This mounting arrangement helps to prevent damage from shocks or the like caused by rough handling. The raised portions 48 extend from the inner surface 44 a distance substantially sufficient for accepting most of the terminals 14 as best illustrated in FIGS. 6, 7 and 8. The terminals 14 penetrate the abutting surface 52 of the raised portions 48 until the wire wrapping from a plurality of jumper or panel wires 50 contact the abutting surface 52 as shown in FIG. 2. It will be noted that only some of the terminals 14 are inserted into the raised portions 48 to keep the jumper wires 50 in their initial installation position. With only some of the terminals 14 being used less pressure or force is required for insertion of the terminals into the raised portions 48.

The ends of the remaining terminals 14 located between the raised portions 48, as shown in the Figures, are disposed between the raised portions 48 and in contact with the inner surface 44 of the pallet 10. This abuttable arrangement serves to limit the depth of the penetrating terminals 14 in their respective raised portions; because if all of the terminals were to be inserted into the plastic material 54 of the pallet greater pressure or force would be required for inserting the terminals therein. Thus the inner surface 44 of the pallet 10 serves as a stop when the remaining terminals 14 abut the inner surface 44.

One of the important features of the pallet 10, being composed of polystyrene foam is its resiliency which provides an ideal gripping characteristic for securing the terminals 14 therein. The gripping force of the plastic material 54 functions like an adhesive over the outer surface of the terminal 14 when it penetrates the raised portion 48 of the pallet 10. This gripping characteristic of the polystyrene foam serves to ensure frictional retention of the terminal 14 in the plastic material 54. Furthermore, the cooperation between the terminals 14 and the polystyrene foam serve as securing means for the pallet 10 without the need of any fasteners such as bolts, screws or the like.

In addition, it will be seen in FIGS. 1 and 4 that thee are a plurality of holes or access apertures 56 which extend through the main body of the pallet 10. The access apertures 56 are disposed in rows and columns and are located between the raise portions 48 as shown. They are in a spaced relationship on the pallet 10 and are in alignment with their associated mounting screw 40 when the backplane assembly 12 is joined thereto. The jumper wires 50, as previously mentioned, are positioned away from the area of the mounting screws 40. To avoid the possibility of an installer having his mounting tools such as a screw driver 58 demaging the wires 50 during installation of the backplane assembly 12.

OPERATION

The method employed for preparing the backplane assembly 12 for packaging, shipping and facilitating in the mounting of the assembly to the backplane frame 18 is believed to be readily understood from the previous description herein. However, it may be helpful to reiterate the operational procedure in general, having in mind the advantages given in the servicing of backplane assemblies and the like as well as to consider certain modification that may be made.

Figure 5:
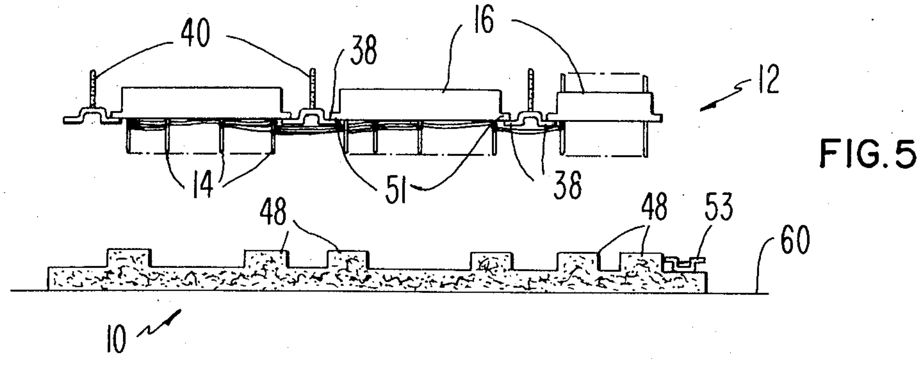
FIG. 5 is a diagrammatic view illustrating the backplane assembly prior to attachment to its associated one-piece pallet.

FIGS. 5 through 8 diagrammatically illustrate the mutual cooperation between the pallet 10 and the backplane assembly 12 during shipping and its mounting to the support frame 18. The usual practice at the present time is to place the pallet 10 in a horizontal position with the outer side 46 of the pallet 10 upon a support member 60 such as a bench or the like. As shown in FIG. 5 the pallet 10 is in its pre-mounting position with the raised portions 48, as previously mentioned, exposed to the terminals 14 of the backplane assembly 12. When the terminal and wire side 13 of the assembly 12 have been tested and found to be trouble free, a downward pressure on the assembly 12 will urge it against the pallet 10 forcing some of the terminals 14 into the position of FIG. 8 where they are held tight by the gripping force of the raised portions 48 as explained earlier. The depth of the raised portions 48 may, of course, be designed for accommodating several different lengths of terminals 14 used by industry. It will also be appreciated that the relative position of the raised portions 48 on the pallet 10 is subject to change depending, of course, on the size of the connector block 16. Each of the pallets 10 is provided with the mounting bracket 53 which is carried by the end portion 47 thereof.

The outermost side and end edge portions of the pallet 10 are adapted to conform to the inner dimensions of a shipping container (not shown) upon insertion of the backplane assembly 12 therein. The pallet will readily serve as a spacer and filler for stabilizing the assembly in the container during shipping. Thus, the mutual contact between the pallet 10 and the inside surface of container provides a protective padding effect which will reduce the impact forces transmitted to the assembly 12 during shipping of the assembly 12 from the factory to the customer.

Upon receiving the backplane assembly 12, the installer need only remove the assembly from the shipping container and position the assembly 12 in the mounting position rearwardly of the support frame 18 as shown in FIGS. 4 and 7. Installation is then accomplished by securing the mounting screws 40 into the tapped holes 48 of the mounting brackets 26, securing the backplane assembly 12 to the support frame 18. The cable mounting bracket 53 will be removed and then secured to the support frame 18 for carrying wire interface from backplane package to backplane package. Once when the installation of the assembly is completed, the pallet 10 may be removed or pulled away from the terminals 14 as indicated in FIG. 8. This will completely expose the backplane assembly 12 so that the installer may finish the installation procedure by added or connecting additional circuit board cards 32 to their respective connector blocks 16.

While this invention is directed to the protection of terminals and wires of a backplane assembly, it will be understood, that other electronic elements such as printed circuit borads and other circuit components each having sensitive projecting parts will be protected with slight modifications of the one-piece pallet.

What is claimed is:

1. A protective panel and electronic sub-assembly comprising, in combination:

an electronic support frame housing a plurality of printed circuit boards;

a backplane assembly mounted on said support frame, said backplane assembly having a plurality of spaced apart mounting brackets and including a plurality of connector blocks secured to the brackets and extending therebetween, said connector blocks including a plurality of outwardly extending terminals and jumper wires for serving as a terminal and wire side and the other side serving as a means for coupling said circuit boards, by insertably mating with their associated connector blocks;

a molded one-piece pallet including side and end edge portions properly overlying the backplane assembly and dimensioned to overlay the edges thereof; and a plurality of raised portions integral with said inner side of said pallet said raised portions extending across said inner surface from one side edge portion thereof, said raised portions providing an engageable surface for receiving said terminals when said terminals penetrate said engageable surface of said raised portions, thereby ensuring frictional retention for providing maximum protection to the terminal and wire side of said backplane assembly.

2. The combination of claim 1 wherein:

said pallet includes a plurality of access apertures therethrough, said sccess apertures being coaxial with mounting screws extending from said mounting brackets of said backplane assembly for mounting of said backplane assembly by a screw driver to said support frame.

3. An improved removable pallet structure for protecting an electronic assembly from damage during shipping and installing, the assembly including fastening devices for securing the assembly to a support frame, the pallet having an inner and outer surface wherein the inner surface of the pallet is disposed to the terminal and wire side of the assembly wherein the improvement comprises:

a plurality of raised portions integral with said inner surface of the pallet wherein a plurality of terminals of the electronic assembly penetrate and are frictionally retained in said raised portion, and said pallet configured to form a plurality of apertures each aligned with the fastening devices of the electronic assembly to allow the mounting of the electronic assembly without its removal from said pallet.

4. An improved removable pallet structure as defined in claim 3 wherein the inner surface exposed between said raised portions of the pallet abuts those terminals of the assembly not penetrating said raised portions to thereby effectively limit the depth of penetration of those terminals that do penetrate raised portions.

5. An improved removable pallet structure as defined in claim 3 wherein the removable pallet is molded from polyurethane foam.

6. An improved removable pallet structure as defined in claim 3 wherein said raised portions form a plurality of ribs which extend across said inner surface from one edge of said panel to the other edge for providing stronger backing to said electronic assembly during handling.

7. An improved removable pallet structure defined in claim 3 wherein the terminals penetrate said raised portions to a depth wherein the wire wound around the terminals will abut said raised portions thereby being effective for keeping said wires in their initial installation position.

* * * * *